United States Patent [19]
Mitani et al.

[11] Patent Number: 5,943,303
[45] Date of Patent: Aug. 24, 1999

[54] DISK PLAYBACK DEVICE AND METHOD OF CONTROLLING THE DEVICE

[75] Inventors: Tadahiro Mitani, Matsubara; Keiji Hirao, Moriguchi; Hitoshi Ogata, Sakai; Masanao Yoshida, Osaka, all of Japan

[73] Assignee: Sanyo Electric Co., Ltd., Osaka, Japan

[21] Appl. No.: 08/864,432

[22] Filed: May 28, 1997

[30] Foreign Application Priority Data

May 30, 1996 [JP] Japan ..................................... 8-136065

[51] Int. Cl.⁶ ............................ G11B 17/22; G11B 17/08
[52] U.S. Cl. ........................................... 369/33; 360/98.06
[58] Field of Search .................................. 369/33, 34, 37, 369/77.1, 178, 179, 214, 192; 360/98.06

[56] References Cited

U.S. PATENT DOCUMENTS

| | | | |
|---|---|---|---|
| 5,214,628 | 5/1993 | Langman et al. | 369/37 |
| 5,235,579 | 8/1993 | Ross | 369/37 |
| 5,615,184 | 3/1997 | Tsuruta et al. | 369/37 |
| 5,719,725 | 2/1998 | Nakao | 360/98.06 |
| 5,721,715 | 2/1998 | Mitani et al. | 369/33 |

*Primary Examiner*—John H. Wolff
*Assistant Examiner*—Angel Castro
*Attorney, Agent, or Firm*—Armstrong, Westerman, Hattori, McLeland & Naughton

[57] ABSTRACT

A chassis has rotatably mounted thereon a magazine for accommodating a plurality of disks as positioned upright. A playback portion and an insertion-discharge portion are arranged respectively inside and outside the magazine radially thereof. Roller units for holding and transporting the disk are provided between the insertion-discharge portion and the magazine and between the magazine and the playback portion, respectively. The roller units are coupled together by a train of gears and driven by a motor M3 to rotate in directions opposite to each other. Control apparatus is disposed within the device main body for energizing the motor M3 for a specified period of time before the magazine is rotated to rotate the roller units in directions to draw the disk into the magazine.

1 Claim, 10 Drawing Sheets

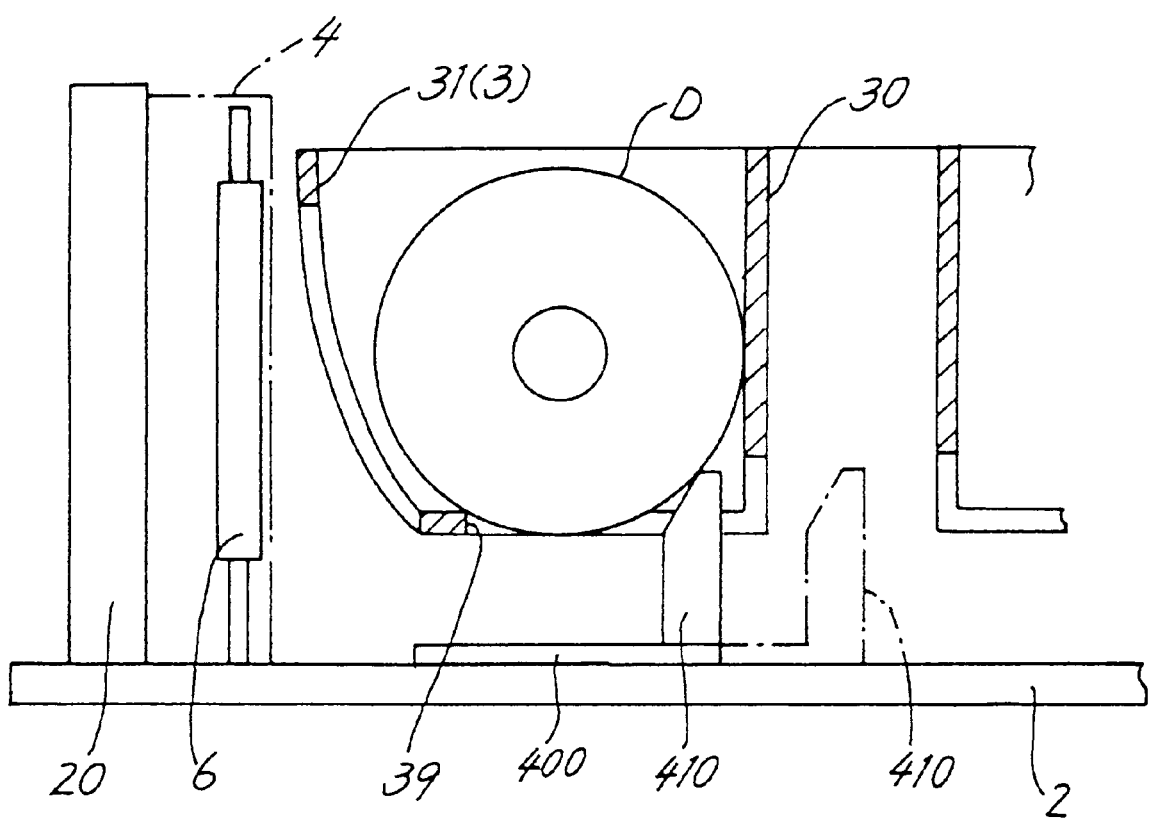

DISK PLAYBACK DEVICE AND METHOD OF CONTROLLING THE DEVICE

FIELD OF THE INVENTION

The present invention relates to disk playback devices of the so-called autochanger type adapted to accommodate a plurality of disks serving as recording media and to play back the desired disk, and to a method of controlling the device.

BACKGROUND OF THE INVENTION

Various playback devices of the autochanger type have been proposed in which a plurality of disks are accommodated as positioned upright for playing black the desired disk. The present applicant also has already proposed the device shown in FIGS. 11 and 12 (see JP-A-195842/1994). In the following description, the direction in which the disk is inserted will be referred to as "front," and the direction of discharge of the disk toward the front panel as "rear. "

The illustrated device has a magazine 3 rotatably mounted on a chassis 2 for accommodating disks D. A disk insertion-discharge portion 4 and a playback portion 7 spaced apart from each other are arranged outside the path of rotation of the magazine 3. The magazine 3 is formed with 24 disk spaces 31 arranged radially for accommodating disks D as positioned upright. Roller units 6, 60 for holding and transporting the disk are provided inside the insertion-discharge portion 4 and between the playback portion 7 and the magazine 3.

A front panel 20 provided at the front side of the chassis 2 has a vertically elongated opening 41, which is provided with a rotary shutter 40. The shutter is opened by a rotating mechanism (not shown) for the insertion or discharge of the disk.

When to be placed into the magazine 3, the disk D is inserted through the opening 41 of the rotary shutter 40. The disk D is held by the roller unit 6 and transported thereby into the magazine 3.

When placed into the magazine 3, the disk D fits into a holding groove 39 in a bottom plate defining the spaces 31 as shown in FIG. 12. A kickout member 400 is slidably provided on the chassis 2 between the insertion-discharge portion 4 and the center of rotation of the magazine 3. Projecting from one end of the kickout member 400 is a pusher 410 which is movable into and out of the disk space 31 of the magazine 3.

When no disk is inserted into the magazine 3, the pusher 410 is positioned in the disk holding groove 31 as indicated in solid line in FIG. 12, preventing the magazine 3 from rotating inadvertently. When the magazine 3 is to be rotated, the kickout member 400 is slidingly moved toward the center of the magazine 3 to retract the pusher 410 from the interior space of the magazine 3 as indicated in solid line in FIG. 12. The magazine 3 rotates without being blocked by the pusher 410.

However, the device described has the following problems.

If the main body 100 of the device is installed as tilted, the disk D will not be loaded into the magazine 3 properly but is likely to be positioned as partly projected from the inner or outer periphery of the magazine 3 as shown in FIG. 10 (a) or 10 (b) to hold the magazine 3 at rest. When the magazine 3 is rotated in this state, the disk D is likely to become damaged by being caught by the roller unit 6 or 60 or other guide member.

Furthermore, the playback portion 7 is disposed outside the magazine 3 and therefore inevitably makes the device main body 100 greater in size.

In view of the need to compact the device main body 100, the present applicant has proposed an arrangement wherein the playback portion 7 is disposed inside the magazine 3, and the opening 41 of the main body 100 and the playback portion 7 are positioned in alignment with the path of transport of the disk, with the magazine interposed between the opening and the playback portion.

With this arrangement, the roller units 6, 60 need to be arranged between the playback portion 7 and the magazine 3, and between the magazine 3 and the opening 41, respectively. The present applicant has conceived the idea that if the roller units 6, 60 are made rotatable in directions opposite to each other and when the roller units 6, 60 are rotated in directions to draw the disk into the magazine 3, the disk, even if initially projecting from the magazine 3, can be reliably accommodated in the magazine 3, consequently rendering the magazine 3 rotatable free of any trouble.

SUMMARY OF THE INVENTION

An object of the present invention is to provide a disk playback device of the type described wherein the disk, even if projecting from the magazine and holding the magazine at rest, is drawn into and accommodated in the magazine before the magazine is rotated so as to prevent the disk from becoming damaged by the rotation of the magazine.

The present invention provides a disk playback device which comprises roller units 6, 60 arranged between an opening 41 and a magazine 3 and between the magazine 3 and a playback portion 7, respectively, for holding and transporting a disk as kicked out from the magazine 3. The roller units 6, 60 are rotatable in directions opposite to each other and drivingly rotated by a motor M3. Control means is provided within the main body 100 of the device for energizing the motor M3 for a specified period of time before the magazine 3 is rotated to rotate the roller units 6, 60 in directions to draw the disk into the magazine 3.

The roller unit 6 disposed outside the magazine 3 and the roller unit 60 disposed inside the magazine 3 are coupled together by a gear train 67 and rotate in directions opposite to each other. Accordingly, even if the disk partly projects from the magazine 3 with the device main body 100 initially positioned as tilted, the roller units 6, 60 are first rotated by the control means in the disk drawing-in direction to reliably draw the disk into the magazine 3 before the magazine 3 is rotated. This eliminates the likelihood that the disk will be damaged as in the prior art by being brought into striking contact, for example, with the roller unit 6 or 60.

BRIEF DESCRIPTION OF THE DRAWINGS

FIG. 12 is a view in section taken along the line A—A in FIG. 11.

DESCRIPTION OF THE PREFERRED EMBODIMENT

[Brief Description of Entire Device]

An embodiment of the invention will be described below in detail with reference to the drawings.

Figure 1:
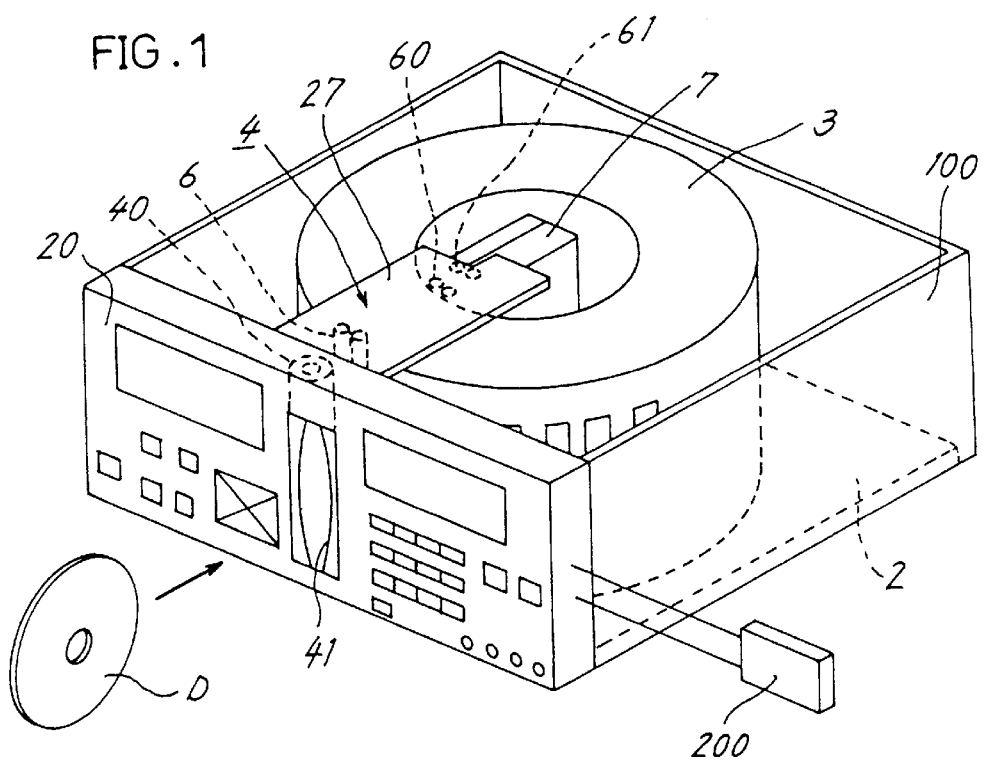
FIG. 1 is a perspective view of a disk playback device.
Figure 2:
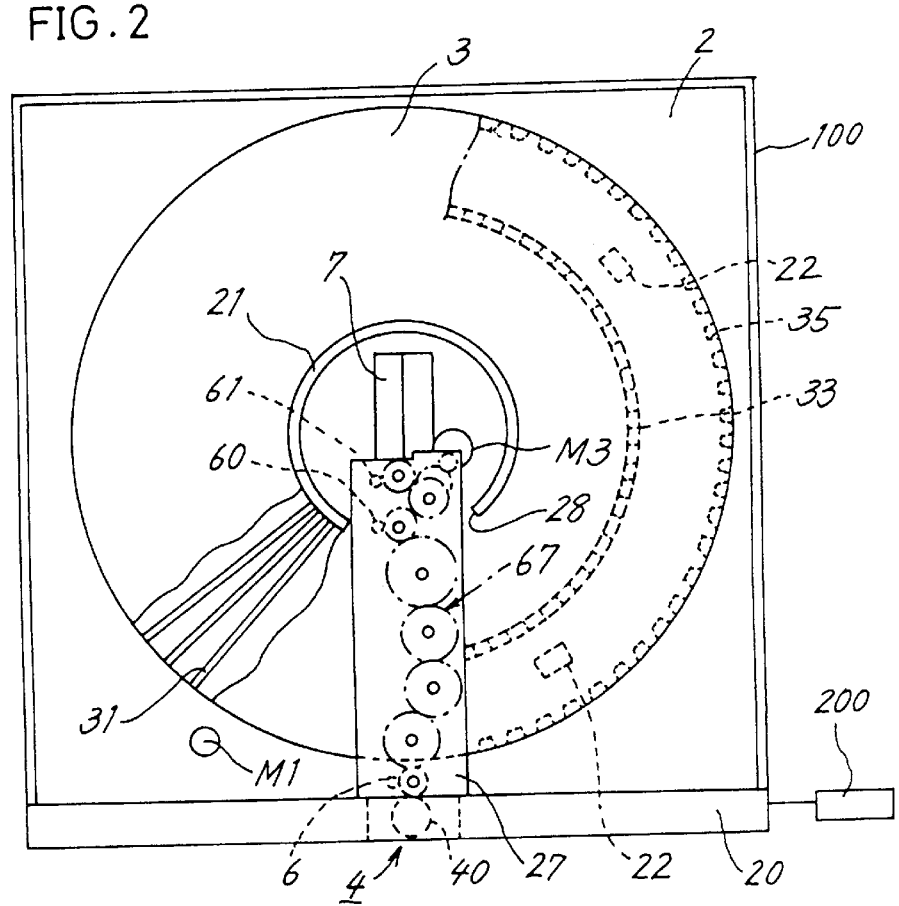
FIG. 2 is a plan view of the same.

The embodiment is generally shown in FIGS. 1 and 2. A chassis 2 is provided at its front side with a front panel 20 having various operation buttons as in the prior-art device. Connected to the front panel 20 is a processor 200 having a memory function and having various command signals stored therein. The front panel 20 has at its center a rotary shutter 40 which is centrally formed with an opening 41 for passing a disk D therethrough. Rotatably mounted on the chassis 2 is a magazine 3 in the form of a double cylinder for accommodating a plurality of disks D in a radial arrangement. A playback portion 7 is disposed inside the magazine 3. An insertion-discharge portion 4 is disposed outside the path of rotation of the magazine 3 and inside the front panel 2 as in the conventional device.

With reference to FIG. 1, the insertion-discharge portion 4, the playback portion 7 and the center of rotation of the magazine 3 are positioned in alignment to shorten the distance from the portion 4 to the playback portion 7. In the insertion-discharge portion 4, a first roller unit 6 for holding and transporting the disk is disposed on a path of transport of the disk. Second and third roller units 60, 61 for similarly holding the disk are arranged between the inner wall of the magazine 3 and the playback portion 7 along a path of advance of the disk.

As seen in FIG. 2, a motor M1 for rotating the magazine 3 is positioned outside the path of rotation of the magazine 3. Disposed in the hollow portion of the magazine 3 is a motor M3 for drivingly rotating the three roller units 6, 60, 61. With the present embodiment of disk playback device, therefore, the two motors M1, M3 are used for rotating the roller units 6, 60 and rotating the magazine 3.

The bottom of the magazine 3 is rotatably fitted to an annular support post 21 provided upright on the chassis 2, and rests on a plurality of support tires 22 arranged on a phantom circle concentric with the post 21. The support post 21 is formed with a cutout 28 for permitting the disk to pass therethrough. A support plate 27 extends between and is provided on the playback portion 7 and the insertion-discharge portion 4 for preventing the magazine 3 from slipping off upward.

Figure 3:
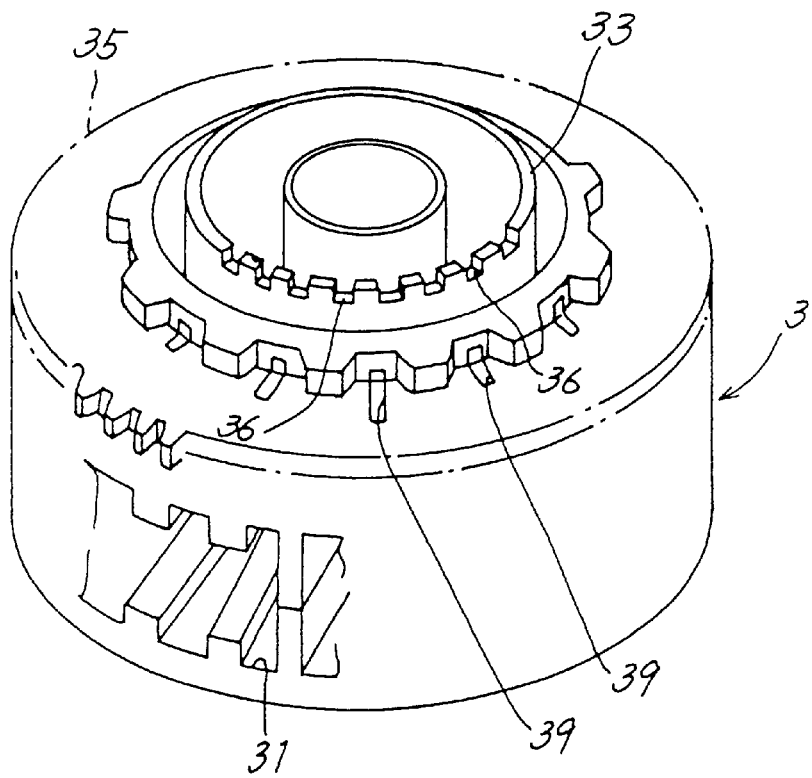
FIG. 3 is a perspective view of a magazine as turned upside down to show the bottom side thereof.

FIG. 3 is a perspective view of the magazine 3 as turned upside down to show the bottom side thereof. As in the prior art, the magazine 3 has a plurality of disk spaces 31 for accommodating respective disks as positioned upright in a radial arrangement. Each disk space 31 has inner and outer opposite ends having an opening formed respectively in the inner and outer walls of the magazine 3. The opening is in the form of a slit for passing the disk therethrough.

The magazine 3 of the present embodiment has disk spaces 31, 150 in total number, in a radial arrangement. With the magazine 3 mounted on the chassis 2, the disk spaces 31 are given respective groove numbers, i.e., No. 1 to No. 150, in a counterclockwise direction.

The magazine 3 has a bottom wall periphery formed with an annular toothed portion 35. Provided on the lower surface of bottom wall of the magazine 3 is a first rib ring 33 concentric with the magazine 3. The ring 33 has hollow windows 36 equidistantly spaced apart and equal in number to the number of the disk spaces 31.

Figure 4:
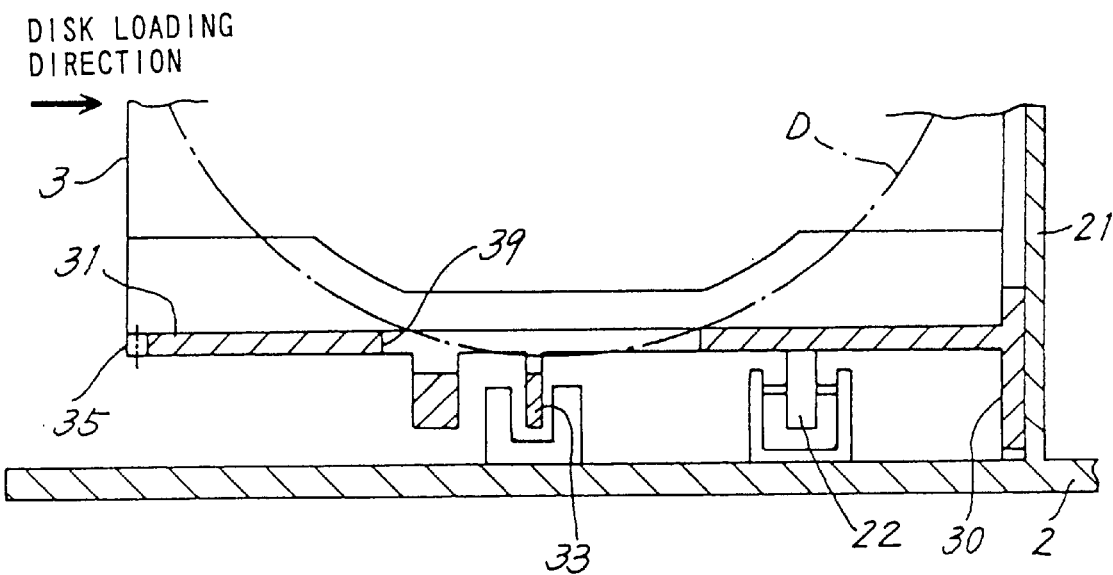
FIG. 4 is a side elevation in section showing the relation between the magazine and sensor means with respect to position.

FIG. 4 is a view in vertical section of the magazine 3. The bottom wall defining the disk spaces 31 has holding grooves 39 formed vertically through the wall, extending radially of the magazine 3 and each adapted to fit the lower end of the disk therein. When placed into the magazine 3, the disk rolls into the holding groove 39 under gravity.

As will be described below, the present embodiment of disk playback device includes a magazine rotating mechanism 5 on the chassis 2, and a mechanism on the support plate 27 for rotating the roller units 6, 60, 61. The chassis 2 has mounted thereon a mechanism (not shown) for kicking out the disk from the magazine 3 to cause the roller units 6, 60 to hold the disk.

Figure 6:
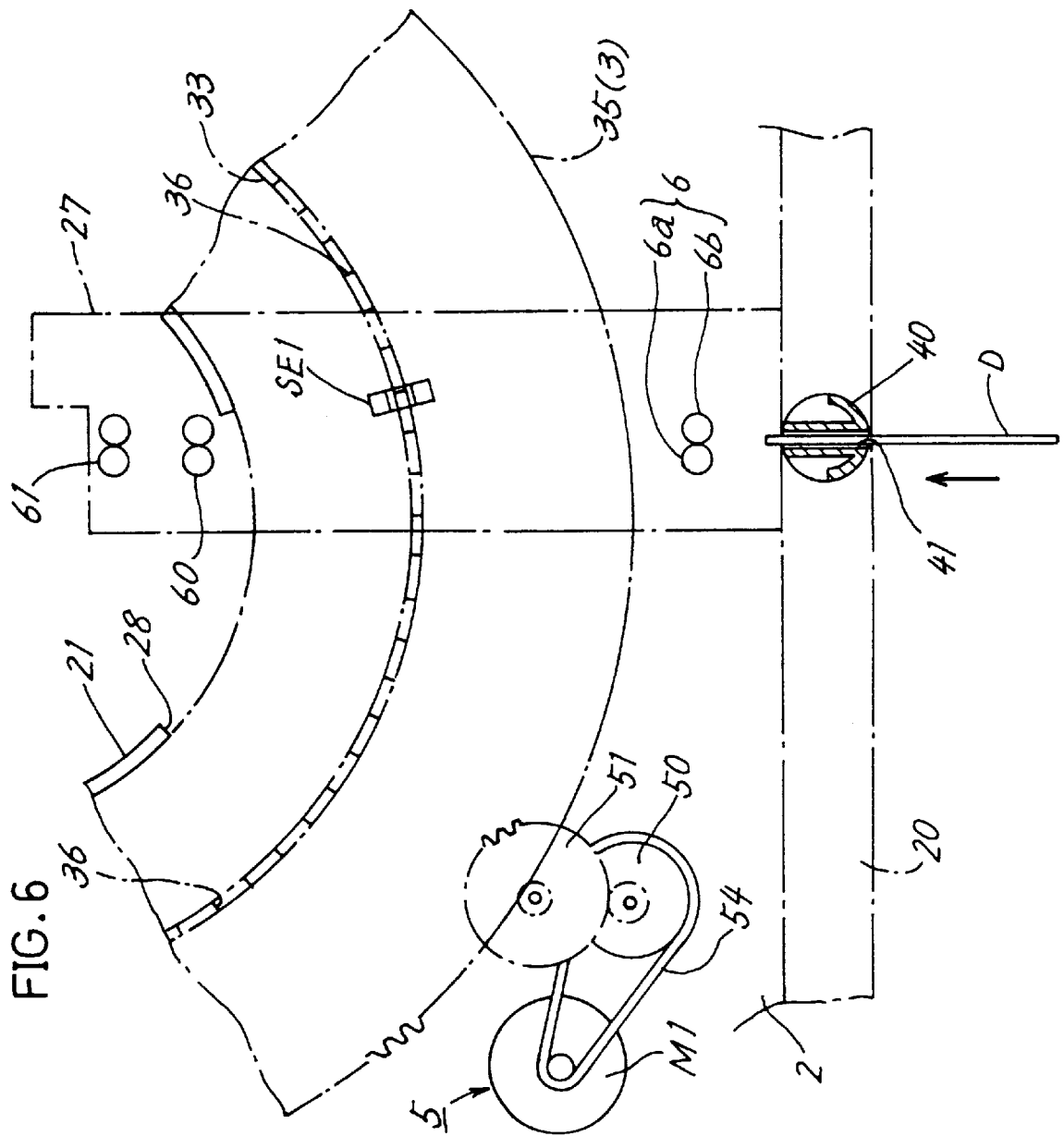
FIG. 6 is a plan view showing the arrangement of a magazine rotating mechanism and roller units.

FIG. 6 is a plan view showing the magazine rotating mechanism 5 provided on the chassis 2. The motor M1 is coupled to the annular toothed portion 35 of the magazine 3 by a belt 54 and two double gears 50, 51 for rotating the magazine 3 in response to an input from the front panel 20.

Sensor means SE1 comprising a pair of photocouplers is provided on the path of rotation of the first rib ring 33 of the magazine 3. With the rotation of the magazine 3, the sensor means SE1 detects windows 36 moving past the sensor means. The windows 36 are arranged at equal spacings and are equal in number to the number of disk spaces 31. When the sensor means SE1 detects passage of one window 36 and thereafter detects passage of the next window 36, this indicates that the magazine 3 has rotated by an amount corresponding one disk spaces pitch.

When the number of particular disk space 31 to be opposed to the insertion-discharge portion 4 is input from the front panel 20, the magazine 3 is rotated by a number of disk space pitches corresponding to the input number.

Figure 5:
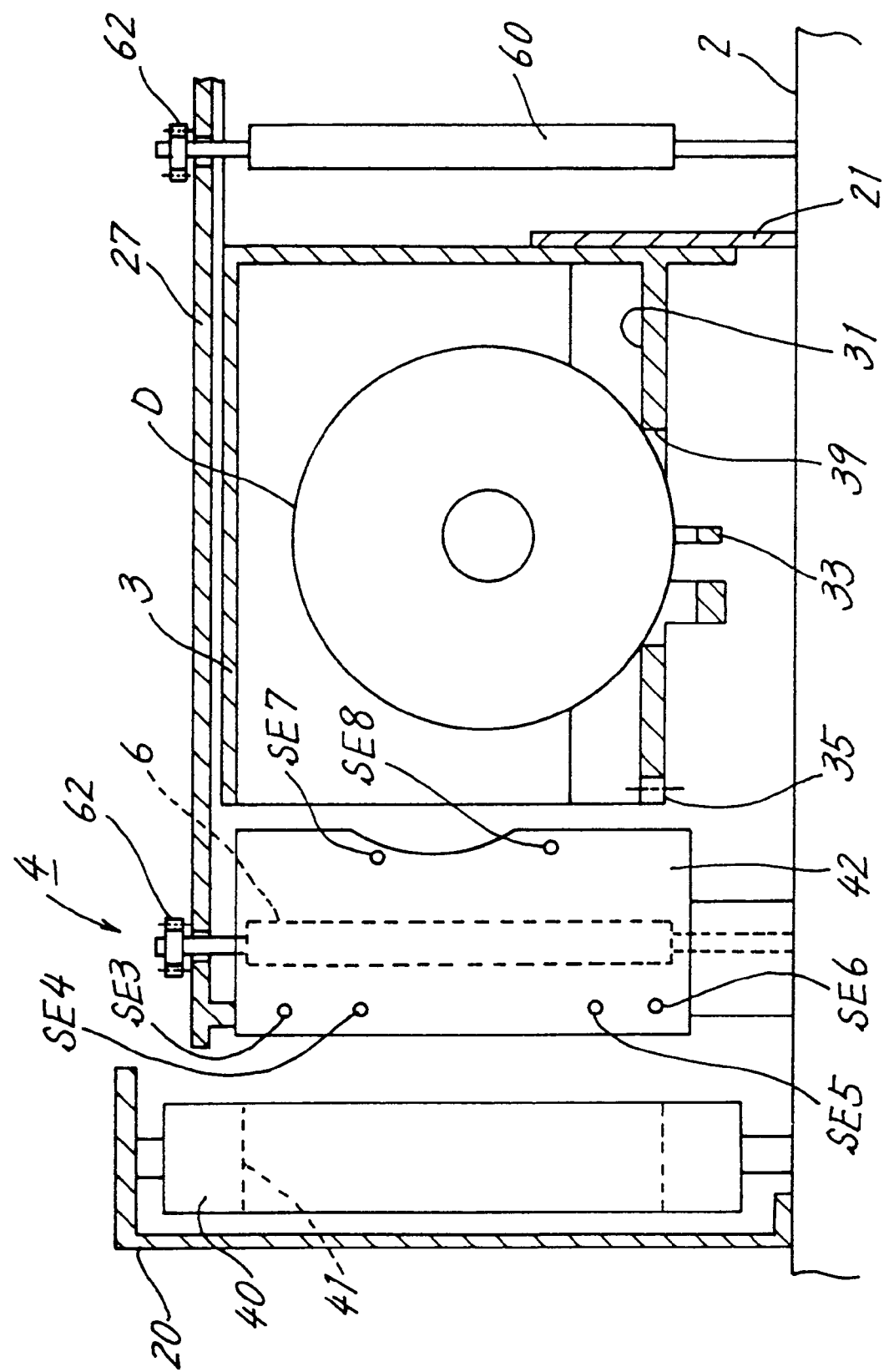
FIG. 5 is a right side elevation showing the positional relation between a rotary shutter, an insertion-discharge portion and the magazine.

FIG. 5 is a right side elevation of the insertion-discharge portion 4, which includes the first roller unit 6 provided on a rear end portion of the support plate 27. Sensor base plates 42 are arranged upright at respective opposite sides of the first roller unit. Mounted on the sensor base plates 42 are six sensors SE3 to SE8 for detecting passage of disks.

The six sensors include four sensors SE3 to SE6 which are arranged vertically in a row. The remaining two sensors SE7, SE8 are arranged inwardly of the first roller unit 6. Such many sensors are provided because two kinds of disks, i.e., those with a diameter of 12 cm and those with a diameter of 8 cm, are placed into the magazine. The insertion of these disks is detected by the sensors. The detecting operation is already disclosed by the applicant in detail in JP-A-195842/1994.

Figure 7:
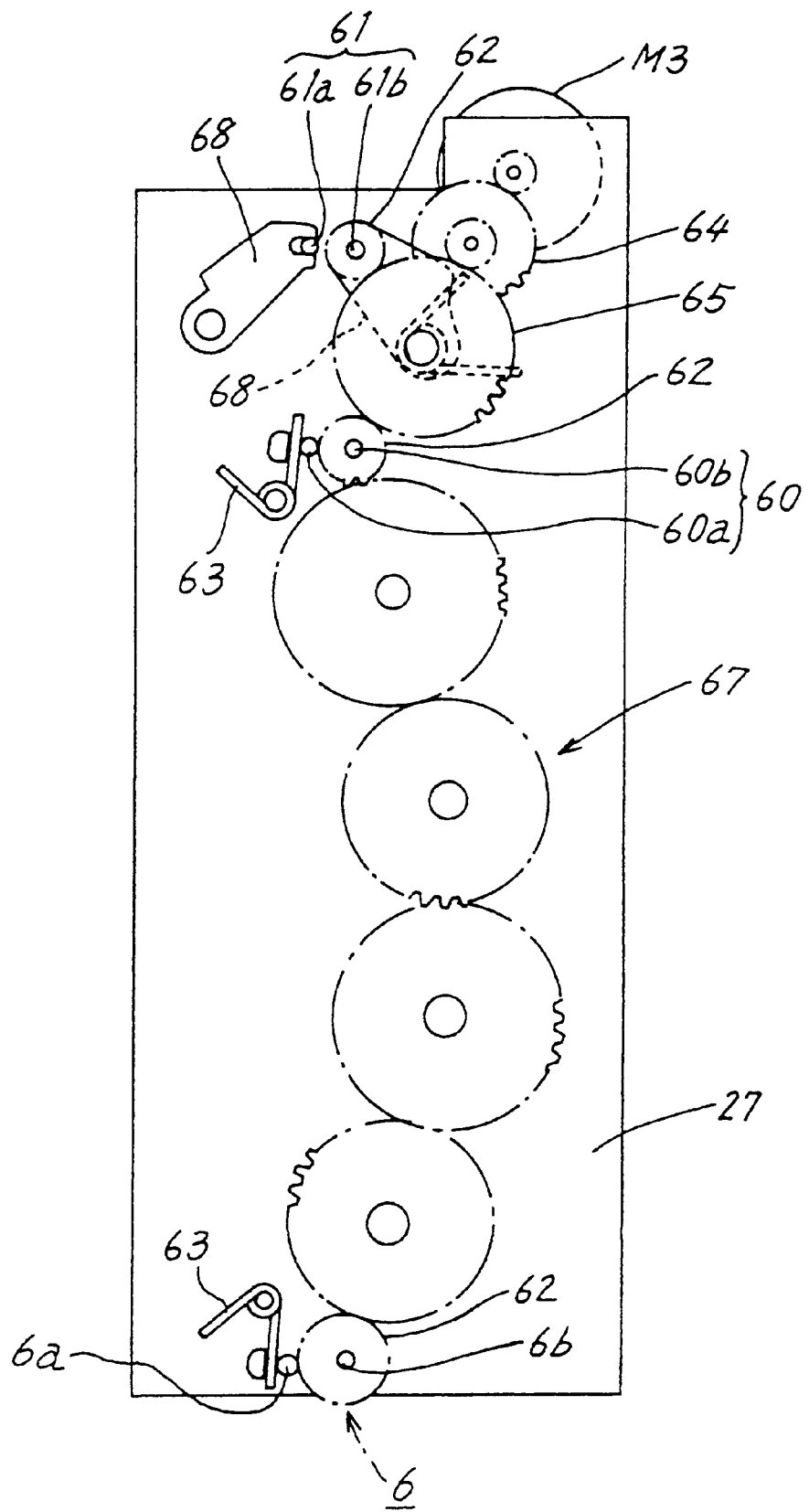
FIG. 7 is a plan view of a mechanism for drivingly rotating the roller units.
Figure 8:
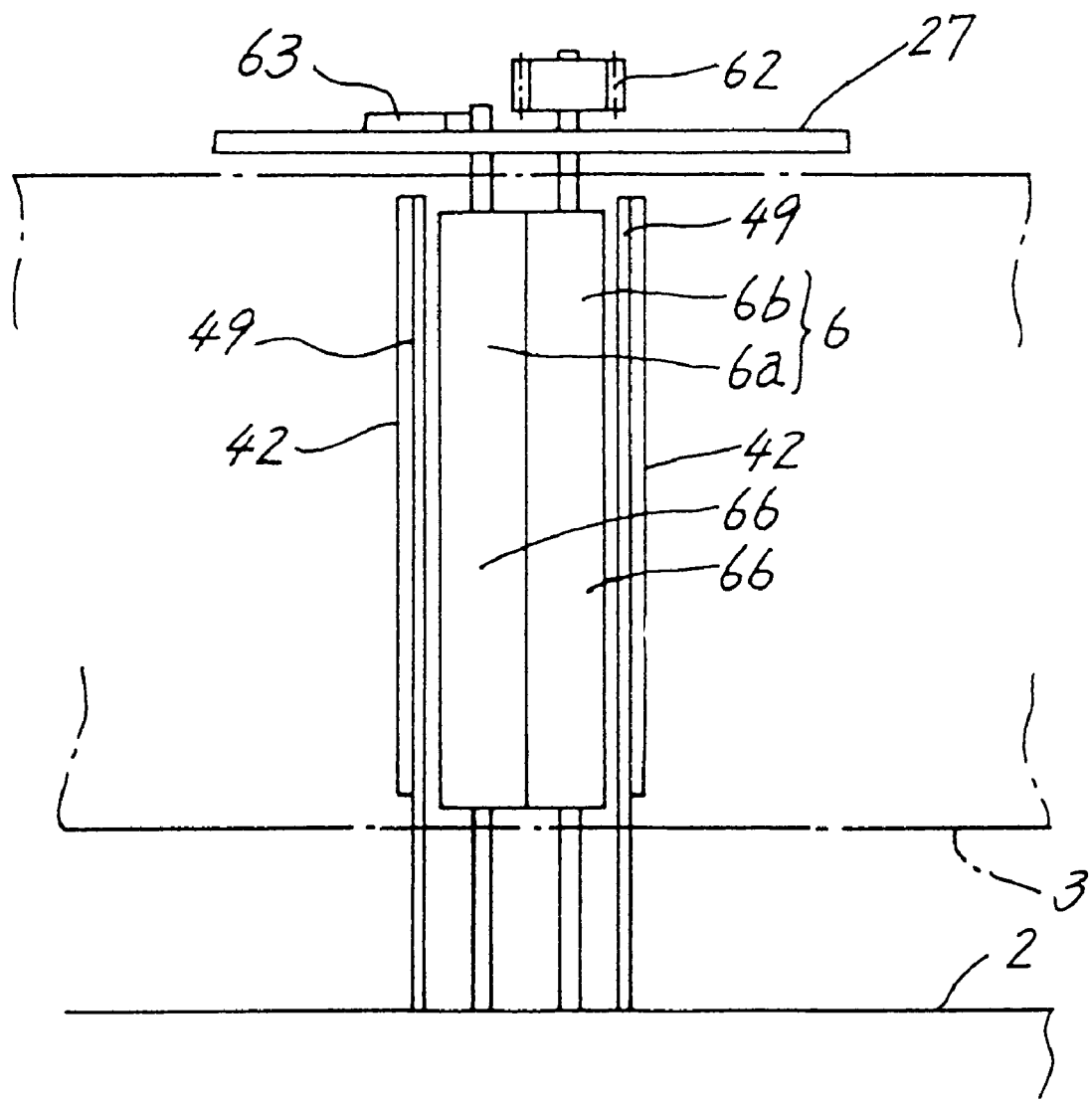
FIG. 8 is a front view showing the first roller unit.

FIG. 7 is a plan view of the mechanism mounted on the support plate 27 for rotating the first and second roller units 6, 60, and FIG. 8 is a front view of the first roller unit 6. The first roller unit 6 comprises a pair of rollers 6a, 6b. The portions of the rollers 6a, 6b for holding the disk therebetween are each covered with a rubber layer 66. The roller 6b at right carries a gear 62 at its upper end. The roller 6a at left has an upper end and lower end which are loosely fitted in the support plate 27 and the chassis 2, respectively, and is movable toward or away from the counter roller 6b.

The roller 6a is biased toward the counter roller 6b by a torsion spring 63 provided in the vicinity of the roller 6a.

The two rollers 6a, 6b are in contact with each other at all times. The second roller unit 60 also has the same construction as the first roller unit 6. The third roller unit 61 includes a right roller 61b provided with a gear 62 at its upper end.

[Roller Rotating Mechanism]

The motor M3 is attached to the underside of the support plate 27 and coupled to the gears 62 of the second and third roller units 60, 61 by two intermediate gears 64, 65. The rotation of the motor M3 rotates the second and third roller units 60, 61 in the same direction. The gear 62 on the roller 60b of the second roller unit 60 is coupled to the gear 62 on the roller 6b of the first roller unit 6 by a train of gears 67. The first roller unit 6 and the second roller unit 60 rotate in directions opposite to each other.

Stated more specifically, when the rollers 6a, 6b of the first roller unit 6 rotate in a direction to draw the disk into the magazine 3, the rollers 60a, 60b of the second roller unit 60 rotate in a direction to draw the disk from the playback portion 7 toward the magazine 3. Conversely, when the rollers 6a, 6b of the first roller unit 6 rotate in a direction to discharge the disk from the magazine 3, the rollers 60a, 60b of the second roller unit 60 rotate in a direction to deliver the disk from the magazine 3 toward the playback portion 7.

The rollers 61a, 61b of the third roller unit 61 are fitted to respective retainers 68, 68 pivotally supported on the support plate 27 and biased toward each other by a spring. The retainer 68 having fitted thereto the right roller 61b of the third roller unit 61 is pivotally supported by the shaft carrying the intermediate gear 65, permitting the roller 61b to revolve along the periphery of the intermediate gear 65. Thus, when the motor M3 rotates, all the three roller units 6, 60, 61 are rotated through the gears 62, and gear train 67.

[Disk Loading Operation see FIGS. 5 and 6]

To insert a disk D into the magazine 3 through the insertion-discharge portion 4 in a standby state, the device main body 100 is energized by manipulating the front panel 20. When inserted into the opening 41 of the rotary shutter 40, the disk D is detected by the sensors SE3 to SE6 of the insertion-discharge portion 4, whereupon the motor M3 rotates. The right roller 6b of the first roller unit 6 rotates, and the disk is held between the rollers 6a, 6b and drawn into the magazine 3, rolls along in one of the disk spaces 31 and rolls into the holding groove 39 of the disk space 31 under gravity.

Upon lapse of a specified period of time after the detection of passage of the disk by the sensors SE3 to SE6 of the insertion-discharge portion 4, the motor M3 comes to a halt, holding the first roller unit 6 out of rotation.

[Rotation of Magazine see FIGS. 5 and 7]

When another disk D is to be loaded into the magazine 3 subsequently, the disk space 31 used for accommodating the preceding disk D already has the disk therein and is unable to accept the second disk D, so that the magazine 3 is rotated temporarily to position an empty disk space 31 as opposed to the insertion-discharge portion 4. While which disk space 31 is vacant is indicated on the front panel 20, this will not be described in detail.

Figure 9:
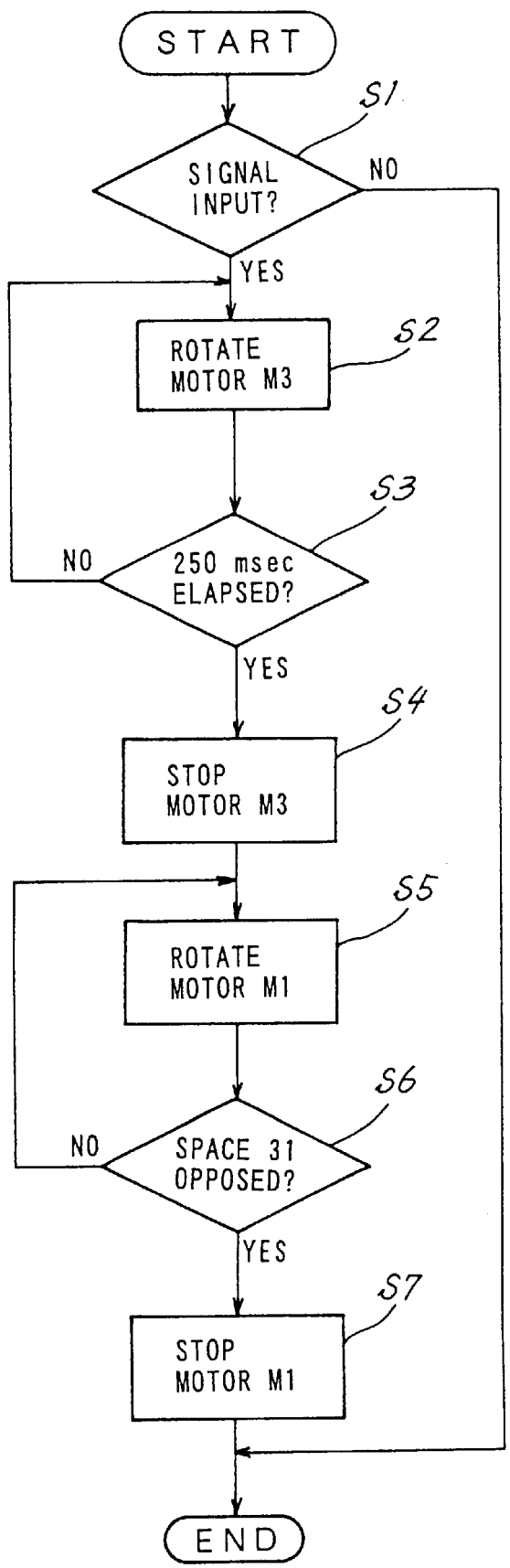
FIG. 9 is a flow chart showing an operation for rotating the magazine.

The present embodiment is characterized by the operation of the processor 200 for rotating the magazine 3. Stated more specifically, the first and second roller units 6, 60 are rotated first in the disk drawing direction before the rotation of the magazine 3. This operation will be described in detail with reference to the flow chart of FIG. 9.

A signal commanding rotation of the magazine 3 is input by the front panel 20 (S1), whereupon the processor 200 energizes the motor M3, rotating both the first and second roller units 6, 60 in directions opposite to each other in the disk drawing-in direction (S2).

Figure 10A:
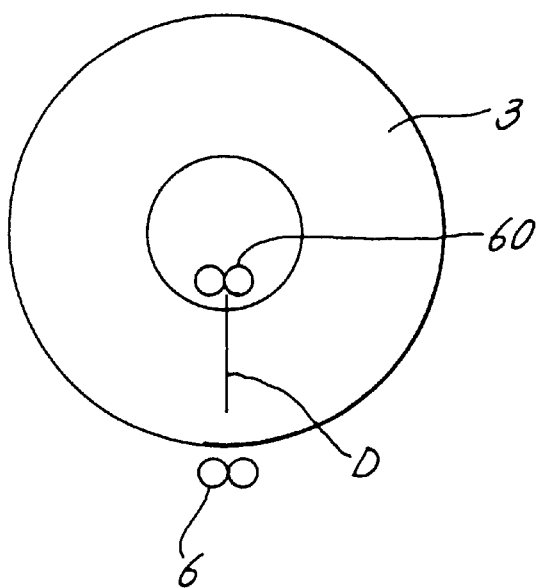
FIG. 10 (a) is a diagram showing a disk positioned as partly projected from the inner periphery of the magazine, and FIG. 10 (b) is a diagram showing a disk positioned as partly projected from the outer periphery of the magazine.
Figure 10B:
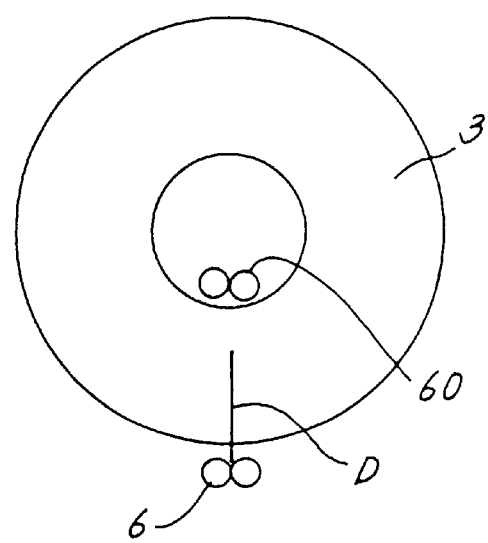
Figure 11:
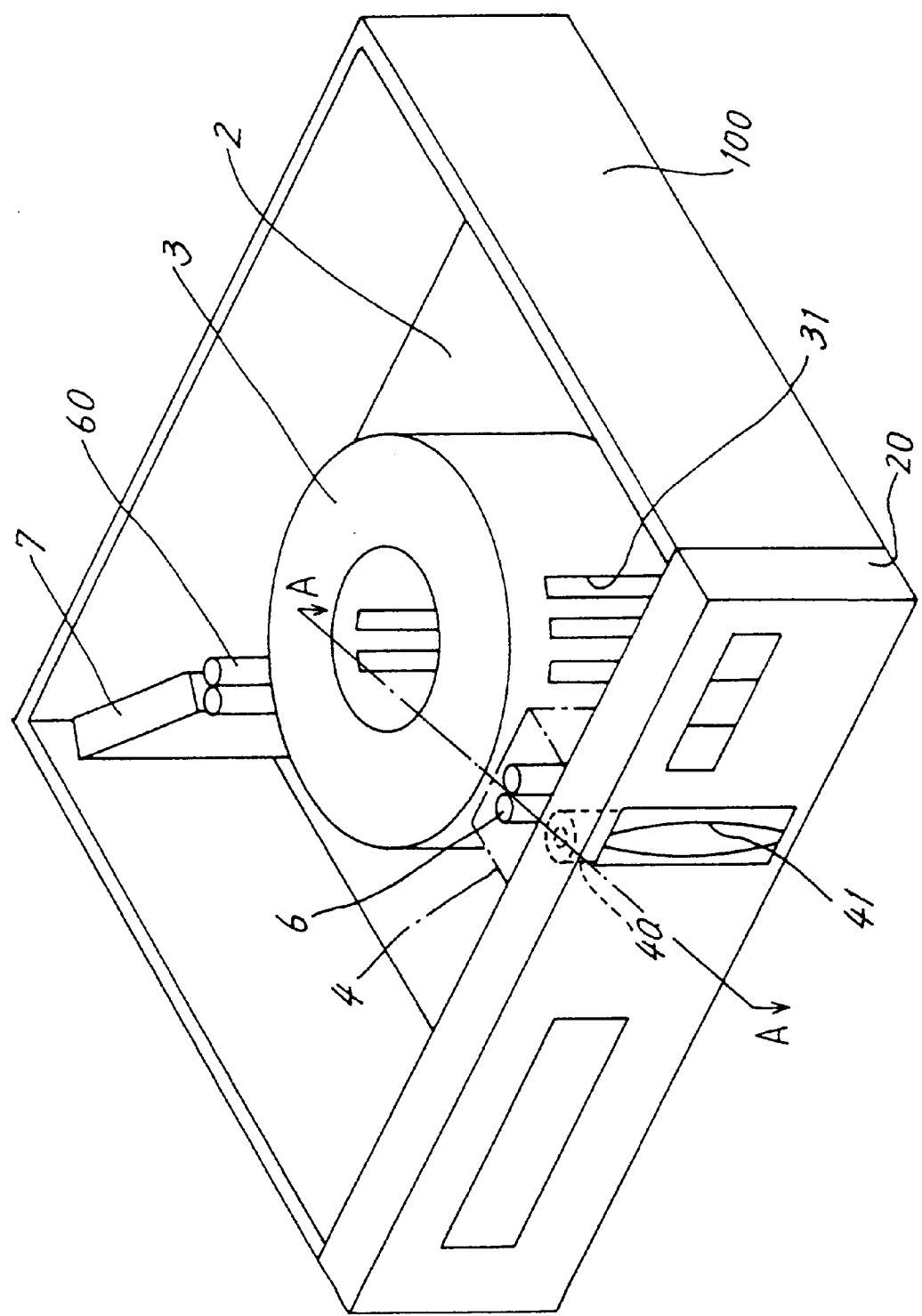
FIG. 11 is a perspective view of a conventional disk playback device.

The reason for effecting this movement is previously stated. It is likely that the magazine 3 is at rest with a disk partly projecting from the magazine 3 as shown in FIG. 10 (a) or (b). If the magazine 3 is brought into rotation in this state, the disk is likely to become damaged by being caught by the roller unit 6 or 60 or other guide member. Accordingly, the roller units 6, 60 are rotated first to completely draw the disk into the magazine 3. This obviates the likelihood of the disk becoming damaged, rendering the magazine 3 rotatable.

The motor M3 is energized for a specified period of 250 msec (S3). Although this period of time, 250 msec, is sufficient for completely drawing the disk into the magazine 3, the value is variable suitably.

Upon lapse of 250 msec, the processor 200 deenergizes the motor M3 (S4) to stop the rotation of the first and second roller units 6, 60. With the disk released from the roller unit 6 or 60 and accommodated in the magazine 3, the magazine 3 is rotatable without the likelihood of the disk colliding with the roller unit 6 or 60. The processor 200 thereafter energizes the motor M1 (S5) to rotate the magazine 3.

As previously stated, the sensor means SE1 provided on the path of rotation of the first rib ring 33 on the magazine 3 counts the number of windows 36 of the ring 33 moving past the sensor means to count the number of disk spaces 31 moving past the insertion-discharge portion 4. When a particular vacant disk space 31 indicated by an input from the front panel 20 and brought to the position opposed to the insertion-discharge portion 4 is detected (S6), whereupon the motor M1 stops rotating (S7) to halt the magazine 3 in rotation.

The disk kickout mechanism thereafter operates to kick out the disk from the magazine 3 toward the playback portion 7 when the disk is to be played back or toward the insertion-discharge portion 4 when the disk is to be unloaded.

In the present embodiment of disk playback device, the roller unit 6 disposed outside the magazine 3 and the roller unit 60 disposed inside the magazine 3 are coupled together by the gear train 67 to rotate in directions opposite to each other. Even if the device main body 100 is initially positioned as tilted, allowing a disk to partly project from the magazine 3, the processor 200 temporarily rotates the roller units 6, 60 in the disk drawing-in direction before the magazine 3 is rotated. This eliminates the drawback of the prior art, i.e. the likelihood that the disk will be damaged by colliding with the roller unit 6 or 60 or other member.

What is claimed is:

1. A disk playback device comprising a magazine rotatably mounted on a chassis within a device main body for accommodating a plurality of disks as positioned upright in a radial arrangement, a motor M1 operative to rotate the magazine in response to a control signal, a playback portion disposed inside the magazine for chucking the desired disk withdrawn from the magazine, a disk kickout mechanism disposed between the playback portion and an opening formed in the device main body and positioned outside the magazine for kicking out the disk from the magazine toward the opening or the playback portion, and roller units arranged between the opening and the magazine and between the magazine and the playback portion, respectively, for holding and transporting the disk kicked out from the magazine, the disk playback device being characterized in that the roller units are driven by a single motor M3 so as to rotate together simultaneously in directions opposite to each other, control means being disposed within the device main body for energizing the motor M3 for a specified period of time to rotate the roller units in directions to draw the disk into the magazine before the magazine is rotated.

* * * * *